(12) United States Patent  (10) Patent No.: US 8,619,513 B1
Challener et al.  (45) Date of Patent: Dec. 31, 2013

(54) RECORDING HEAD WITH NEAR-FIELD ANTENNA AND COMPOSITE POLE

(75) Inventors: William Albert Challener, Schenectady, NY (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/550,280

(22) Filed: Jul. 16, 2012

(51) Int. Cl.
    *G11B 11/00*    (2006.01)

(52) U.S. Cl.
    USPC .................................................. 369/13.33

(58) Field of Classification Search
    None
    See application file for complete search history.

(56) References Cited

U.S. PATENT DOCUMENTS

| | | | |
|---|---|---|---|
| 6,888,984 B2 | 5/2005 | Abeles et al. | |
| 7,027,700 B2 | 4/2006 | Challener | |
| 7,272,079 B2 | 9/2007 | Challener | |
| 7,336,988 B2 | 2/2008 | Schnitzer | |
| 7,652,954 B2 * | 1/2010 | Fontana et al. | 369/13.13 |
| 7,880,996 B2 * | 2/2011 | Stipe | 360/59 |
| 8,169,881 B2 * | 5/2012 | Balamane et al. | 369/112.27 |
| 8,264,918 B2 * | 9/2012 | Hashimoto et al. | 369/13.33 |
| 8,295,132 B2 | 10/2012 | Jin et al. | |
| 8,345,518 B2 | 1/2013 | Khizroev et al. | |
| 8,369,192 B1 * | 2/2013 | Komura et al. | 369/13.33 |
| 8,391,108 B2 | 3/2013 | Peng et al. | |
| 2006/0090178 A1 | 4/2006 | Stipe | |
| 2008/0049563 A1 | 2/2008 | Konno et al. | |
| 2008/0149809 A1 | 6/2008 | Hamann et al. | |
| 2008/0151360 A1 | 6/2008 | Stipe | |
| 2010/0163521 A1 | 7/2010 | Balamane et al. | |
| 2010/0165499 A1 | 7/2010 | Stipe | |
| 2010/0165802 A1 | 7/2010 | Stipe | |
| 2010/0165822 A1 | 7/2010 | Balamane et al. | |
| 2012/0105996 A1 * | 5/2012 | Katine et al. | 360/59 |

OTHER PUBLICATIONS

Shyroki et al., "Dielectric Multilayer Waveguides for TE and TM Mode Matching", J. Opt. A: Pure Appl. Opt. 5, 2003, pp. 192-198.
Dec. 11, 2012, File history for U.S. Appl. No. 13/228,118, 62 pages.

* cited by examiner

*Primary Examiner* — Brenda Bernardi
(74) *Attorney, Agent, or Firm* — Hollingsworth Davis, LLC (57) ABSTRACT

A near field transducer antenna has a first end proximate a media writing surface and a second end proximate a waveguide that delivers light to the antenna. The antenna includes an aperture disposed along a propagation axis that extends from the first end to the second end. A notch protrudes within the aperture. The notch is facing an opening of the aperture that extends along the propagation axis. A magnetic pole is proximate the antenna, and includes a first portion of magnetic material and a second portion of antenna material. The second portion is disposed over the opening of the aperture and facing the notch of the antenna.

19 Claims, 9 Drawing Sheets

RECORDING HEAD WITH NEAR-FIELD ANTENNA AND COMPOSITE POLE

SUMMARY

The present disclosure is generally directed to an optical near-field antenna usable in heat assisted magnetic recording. In one embodiment, an apparatus includes a near field transducer antenna with a first end proximate a media writing surface and a second end proximate a waveguide that delivers light to the antenna. The antenna includes an aperture disposed along a propagation axis that extends from the first end to the second end. A notch protrudes within the aperture. The notch is facing an opening of the aperture that extends along the propagation axis. A magnetic pole is proximate the antenna, and includes a first portion of magnetic material and a second portion of antenna material. The second portion is disposed over the opening of the aperture and facing the notch of the antenna.

These and other features and aspects of various embodiments may be understood in view of the following detailed discussion and accompanying drawings.

DRAWINGS

The discussion below makes reference to the following figures, wherein the same reference number may be used to identify the similar/same component in multiple figures.

DETAILED DESCRIPTION

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One approach for directing light onto recording media uses a planar solid immersion mirror (PSIM) or lens. The PSIM/lens may be fabricated on/with a planar waveguide and may generally include a near-field transducer (NFT). For example, the NFT may be in the form of an isolated metallic nanostructure, placed near the PSIM focus. The NFT is designed to reach a local surface plasmon (LSP) condition at a designated light wavelength. At LSP, a high field surrounding the NFT appears, due to collective oscillation of electrons in the metal. Part of the field will tunnel into an adjacent media and get absorbed, raising the temperature of the media locally for recording.

The power absorption in the HAMR recording media may be dependent, among other things, on head to media spacing (HMS) and power output from NFT or laser. In such a system, the power output requirements may be exponentially inverse to HMS due to the evanescent decay of optical near-field. Such variation may lead to variation of the thermal spot size. As the areal density increases, there is a need to more tightly control the size of the heated portion of the media.

Figure 1:
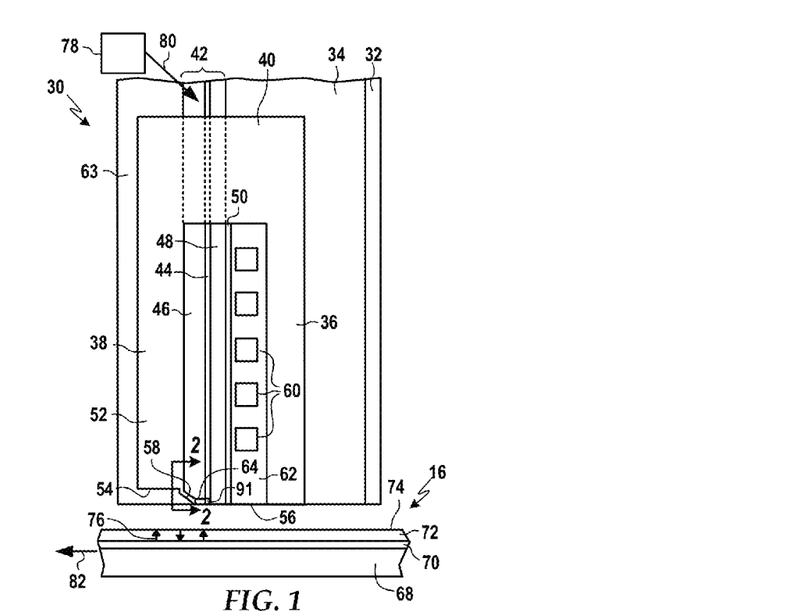
FIG. 1 is a cross-sectional view of a recording head for use in heat assisted magnetic recording according to an example embodiment.

In reference now to FIG. 1, a cross-sectional view is shown of an example recording head usable in heat assisted magnetic recording. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. In one example, the substrate 32 can be AlTiC, the core layer can be $Ta_2O_5$, and the cladding layers 46, 48 can be formed of AlO or $SiO_2$.

The top pole 38 is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion 58 may be structured to include an end adjacent to the air bearing surface (ABS) 56 of the recording head, with the end being closer to the waveguide than the first portion of the top pole. A top layer of insulating material 63 can be formed on the top pole 38. A heat sink 64 is positioned adjacent to the sloped pole piece 58. The heat sink 64 can be comprised of a non-magnetic material, such as Au, Ag, Cu, etc.

A planar coil 60 also extends between the top and bottom poles and around the pedestal. While this example includes a planar coil, other types of coils, such as a helical coil, could be used. A helical coil would wrap around the bottom/return pole. In this example, the top pole serves as a write pole and the bottom pole serves as a return pole. An insulating material 62 separates the coil turns.

As illustrated in FIG. 1, the recording head 30 includes a structure for heating the magnetic storage media 16 proximate to where the write pole 58 applies the magnetic write field H to the storage media 16. The media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The data storage media 16 is positioned adjacent to or under the recording head 30. The waveguide 42 conducts light from a source 78 of electromagnetic radiation, which may be, for example, ultraviolet, infrared, or visible light. The source 78 may be, for example, a laser diode, or other suitable laser light source for directing a light beam 80 toward the waveguide 42. The waveguide 42 may be configured as a rectangular dielectric waveguide. The waveguide 42 includes core layer 44, which can be for example $Ta_2O_5$. Cladding layer 46, which can be for example $SiO_2$, is shown disposed on opposite sides of the core layer 44.

Various techniques that are known for coupling the light beam 80 into the waveguide 42 may be used. For example, the light source 78 may work in combination with an optical fiber and external optics for collimating the light beam 80 from the optical fiber toward a diffraction grating on the waveguide 42. Alternatively, a laser may be mounted on the waveguide 42 and the light beam 80 may be directly coupled into the waveguide 42 without the need for external optical configurations.

Once the light beam 80 is coupled into the waveguide 42, the light propagates through the waveguide 42 toward an end of the waveguide 42 that is formed adjacent the ABS 56 of the recording head 30. Light exits the end of the waveguide and heats a portion of the media, as the media moves relative to the recording head as shown by arrow 82. A near-field transducer 91 is positioned in or adjacent to the waveguide to further concentrate the light in the vicinity of the air bearing surface. Although the example of FIG. 1 shows a perpendicular magnetic recording head and a perpendicular magnetic storage media, it will be appreciated that the invention may also be used in conjunction with other types of recording heads and/or storage media where it may be desirable to employ heat assisted recording.

Figure 2:
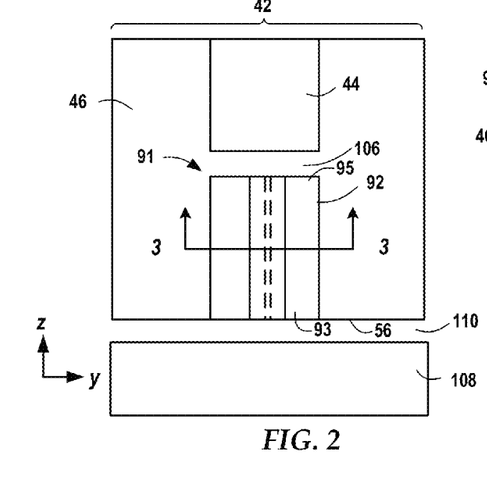
FIG. 2 is a side elevation view of a portion of a waveguide and a near field transducer in the form of an antenna having an E-shaped aperture taken along line 2-2 of FIG. 1.

In various embodiments discussed below, the NFT 91 may include an antenna 92 having a first end 93 proximate the media reading/writing surface (e.g., ABS 56) and a second end 95 proximate the waveguide 42, which delivers light to the antenna 92. In FIG. 2, a side elevation shows NFT 91 and a portion of waveguide 42. Light propagates through the waveguide 42 along the z-axis, which is generally perpendicular to a media reading/writing surface (e.g., air bearing surface 56).

Light is delivered to the NFT 91 via the waveguide 42 via focal point 106 adjacent to the NFT antenna 92. The core layer 44 of the waveguide 42 can be shaped to deliver light to the focal point 106. The antenna 92 is positioned adjacent to data storage medium 108, and may be separated from the storage medium by a gap 110. In hard drive implementations, this gap 110 may correspond to an air bearing gap that separates a media surface from and air bearing surface 56 of a read/write head.

Figure 3:
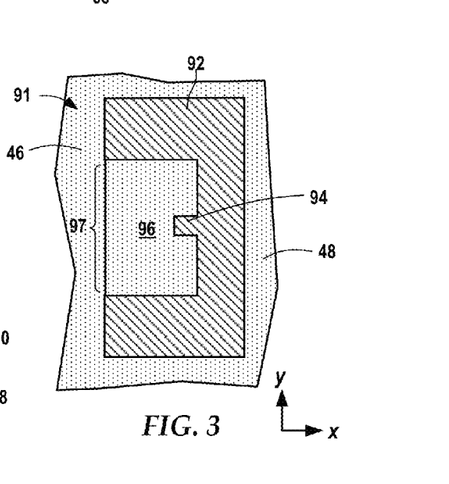
FIG. 3 is a cross-sectional view of the antenna of FIG. 3 taken along line 3-3 of FIG. 2.

In FIG. 3, a cross-sectional view of the antenna 92 is shown that corresponds to section line 3-3 of FIG. 2. This cross section is generally on a plane normal to the propagation axis of light through the waveguide 44 and NFT 91, and illustrates the E-shape of the NFT antenna 92. An aperture 96 extends along the propagation axis that extends from the first to second ends 93, 95 shown in FIG. 2. A notch 94 protrudes within the aperture 96, and the notch 94 may extend some or all of the way between ends 93, 95 of the antenna 92. The notch 94 facing an opening 97 of the aperture 96 that extends along the propagation axis. The notch gives the antenna 92 its E-shaped cross sectional shape. The aperture 96 of the antenna 92 may be filled with a dielectric material, similar to that used in the cladding layers 46, 48 or any other dielectric material (e.g., TaO, AlO, SiON, etc.).

Numerical simulations of performance were performed on the antenna geometry as seen in FIG. 3. The antenna 92 was modeled as being 300 nm wide (in the x-direction) and 600 nm high (in the y-direction), and the notch 94 was modeled as 36 nm by 24 nm in the respective x- and y-directions. The focal point gap 106 (see FIG. 2) was set as 36 nm, and the media gap 110 was 6 nm. These simulations also assumed an incident light delivered to the antenna 92 had wavelength of 830 nm and was polarized in the x-direction. A method of lines simulation used 100 lines with a spacing of 15 nm, and further assumed the following indices of refraction: n=2.1 for the $Ta_2O_5$ core, n=1.5 for the $SiO_2$ cladding, n=0.1856+i (5.3884) for a gold antenna 92, and n=2.53+i(4.94) for Co layer of recording media 108. The Co layer of the media 108 is 50 nm thick. It will be appreciated that these simulation parameters are presented for purposes of illustration and not limitation.

In this case, the method of lines revealed an effective index of 1.77842 and full width at half maximum (FWHM) spot size for the waveguide 42 of 340 nm by 407 nm. The field intensity within the air gap was found to be between 2300 and 2900 and the spot size in the air gap was 34 nm by 29 nm. However, the field intensity within the air gap 110 may not always be a reliable measure of NFT performance, and so the field intensity within the center of the recording medium was also computed. In this case, field intensity within a plane of the medium 108 located 6 nm below the surface is estimated as ranging between 0.72 and 1.2. The spot size at this media depth increased to 99 nm×57 nm, and total power dissipation within a 48 nm×48 nm square was a relatively low 2.3% of the incident power in the waveguide.

Figure 3A:
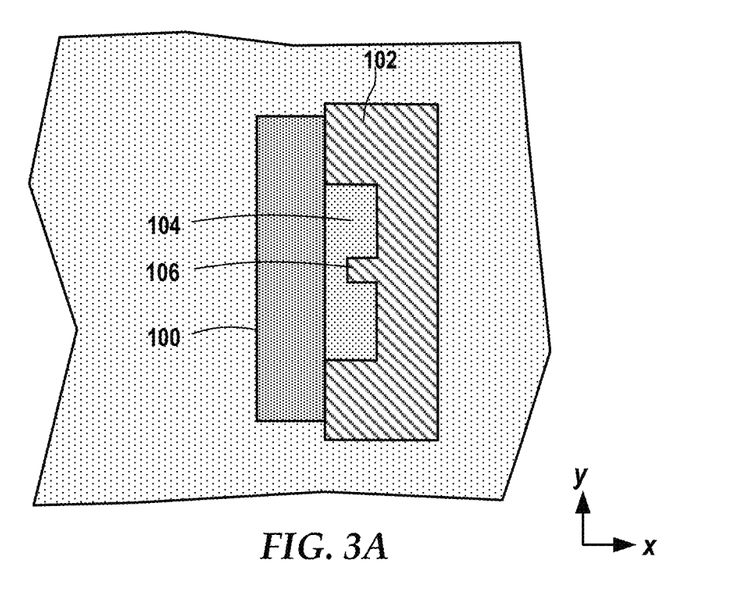

In some embodiments, it may be possible to insert a cobalt recording pole alongside the NFT waveguide with minimal loss in coupling efficiency. This arrangement is shown in FIG. 3A. A cobalt recording pole 100 is positioned near an aperture opening gold NFT antenna 102, which includes notch 106 and dielectric fill within aperture 104 similar to the embodiment shown in FIGS. 2 and 3. The dimensions of the pole 100 and antenna 102 combined approximate the size of the antenna 92 alone in FIG. 3 (e.g., 300 nm×600 nm). The pole 100 is 126 nm thick (in the x-direction), which reduces of the total width (in the x-direction) of the antenna 102 from 300 nm to 174 nm, and the depth of the aperture 104 to 60 nm. In this case, the simulation results in a 54 nm×44 nm hotspot within the medium, which is smaller than the result of the configuration shown in FIGS. 2-3. In addition, 2.1% of the power was transferred into a 48 nm×48 nm hotspot, only slightly less than that obtained without the recording pole 100.

In the embodiments described below, the homogenous magnetic pole 100 is replaced by a composite magnetic pole to improve coupling efficiency of the NFT. For example, a composite magnetic pole may include a first portion of magnetic material and a second portion of antenna material. The second portion is disposed over the aperture opening facing the notch of the antenna (e.g., notch 106 of antenna 102). The magnetic material may include, for example, FeCo, FeCoNi, NiFe, etc. The antenna material used for the second portion may include the same, non-magnetic, plasmonic materials used for the NFT, such as Au, Ag, Al, and alloys thereof.

Figure 4:
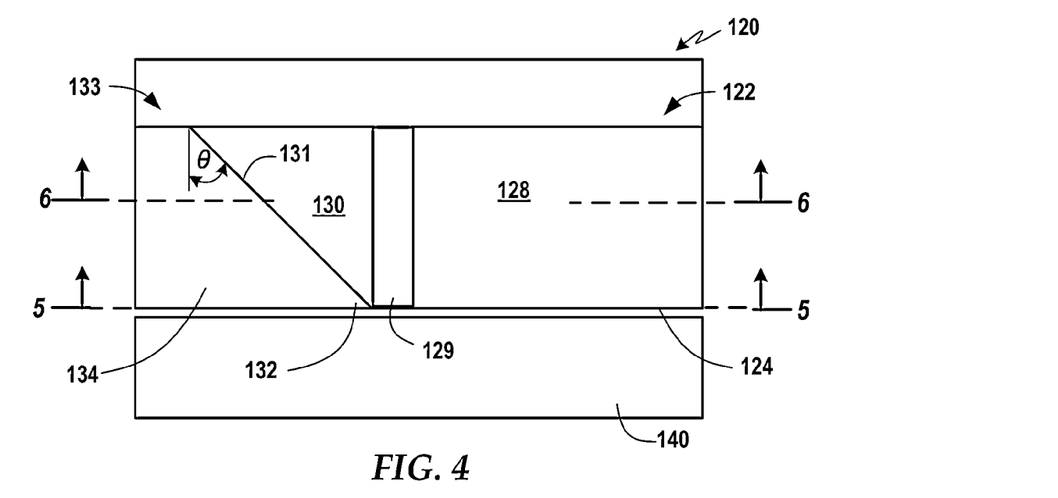
FIG. 4 is an enlarged view of a portion of a recording head including an antenna having a E-shaped aperture according to an example embodiment.

In reference now to FIG. 4, an enlarged view shows a portion of a recording head 120 with a composite NFT according to an example embodiment. An NFT 122 is situated adjacent to an air bearing surface 124. A dielectric core (e.g., formed of TaO or other dielectric material) extends down through and aperture 129 of the antenna 122. The NFT 122 includes an antenna 128 that surround the aperture 129. A portion 130 of antenna material also surrounds the aperture 129. These components 128, 130 may be formed of gold or other NFT antenna materials such as Au alloys, Cu, Ag, Al, etc.

The antenna material portion 130 is part of a composite recording pole 133 disposed proximate the NFT 122. The pole 133 includes a magnetic portion 134 that may be formed from a ferrite material (e.g., FeCo, FeCoNi, NiFe, etc.). The recording pole 133 includes a tip 132 that is positioned closely to the aperture 129 of the NFT antenna 122 at the air bearing surface 124. As indicated by the diagonal line 131, the magnetic portion 134 is separated from the aperture 129 by an increasingly wider antenna portion 130 at distances farther away from the air bearing surface 124. This combination of the magnetic material 134 with the antenna material 130 provides a balance of good magnetic performance (e.g., due to the pole tip 132 being closely proximate the hot spot created by the NFT) and optical efficiency (e.g., the surrounding material 130 improves coupling efficiency of the NFT).

Figure 5:
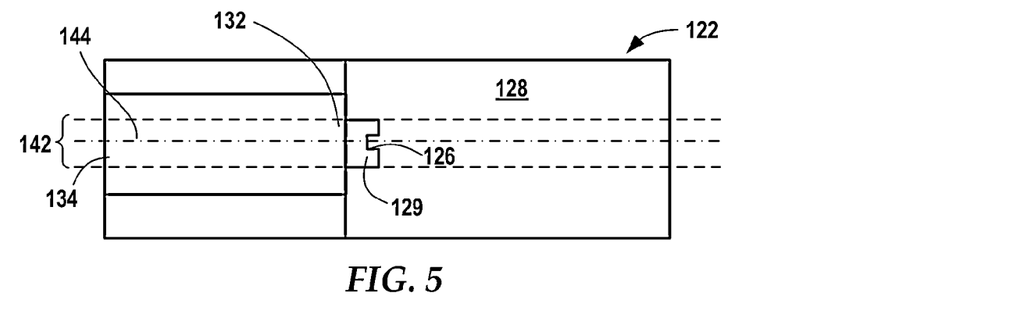
FIG. 5 is a cross-sectional view of a portion of the recording head of FIG. 4 taken along line 5-5 according to an example embodiment.
Figure 6:
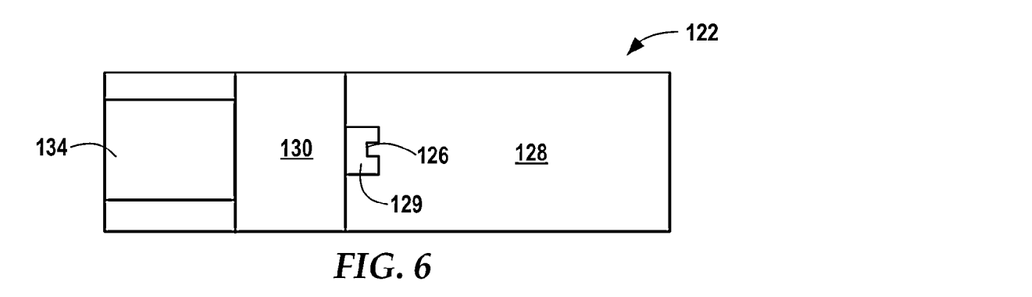
FIG. 6 is a cross-sectional view of a portion of the recording head of FIG. 4 taken along line 6-6 according to an example embodiment.

Shown in FIG. 5 is a view of the recording head of FIG. 4 along section 5-5. This view may correspond to what would be seen looking upwards from below the air bearing surface 124. In this view, a notch 126 can be seen which gives the antenna 122 its E-shape. Shown in FIG. 6 is a cross-sectional view of the recording head of FIG. 4 taken along line 6-6. At this cross-section, the portion 130 of the NFT antenna 122 can be seen separating the aperture 129 and the magnetic portion 134. As seen in of FIGS. 4-6, the composite structure formed by regions 130 and 134 complete one edge of the waveguide aperture 129 over most or all of its length for higher coupling efficiency. At the same time, the tapered pole tip 132 piece can be located closely to the optical hot spot in the data storage medium 140.

In a write operation, data is stored in tracks on the media 140. An approximate location of a data track is illustrated as item 142 in FIG. 5. The near-field transducer and the end of the write pole 132 are aligned on a common line 144 in a direction parallel to the track direction. While FIGS. 1 and 4-6 show an example recording head structure, it should be understood that the invention is not limited to the particular structure shown in FIGS. 1 and 4-6. For example, the aperture 129, notch 126 and other features need not be present along the entire propagation length of the NFT 122, and/or may vary in sized depending on distance from the ABS 124. Similarly, the transition curve 131 need not be linear, but may be any function, e.g., stepwise, parabolic, exponential, logarithmic, etc.

Figure 7:
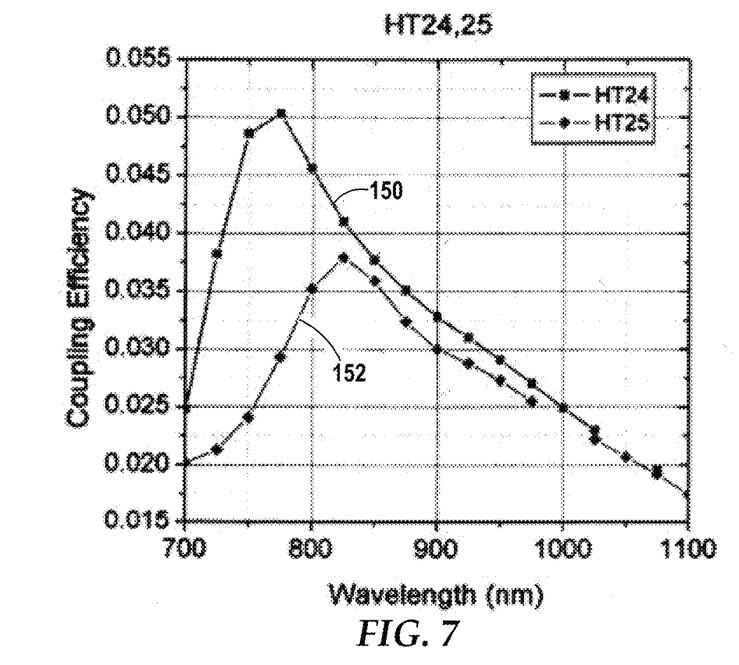
FIG. 7 is a graph of coupling efficiency versus wavelength according to an example embodiment.
Figure 8:
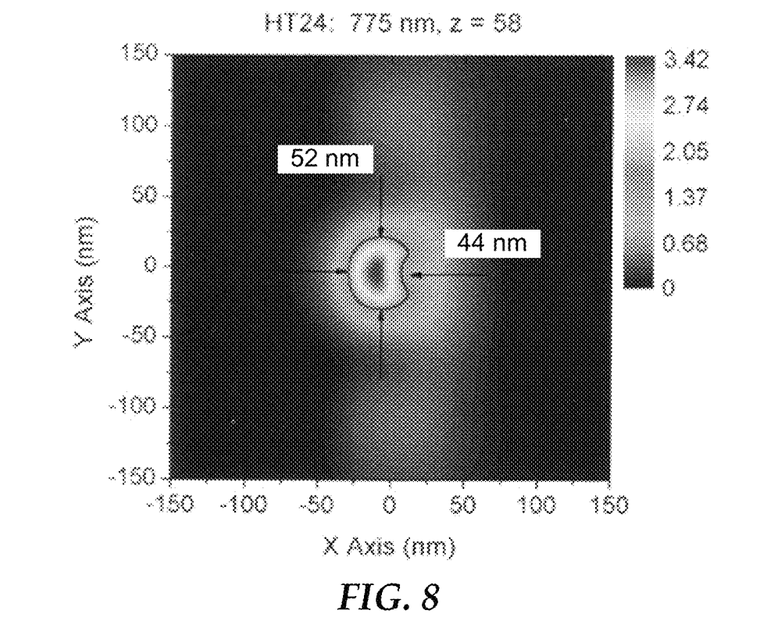
FIG. 8 is a schematic representation of a thermal profile according to an example embodiment.

Shown in FIGS. 7 and 8 are results of computational modeling of the recording head and NFT structures of FIGS. 4-7. In FIG. 7, coupling efficiencies are shown as a function of wavelength for an E-shaped aperture 129 with a linearly sloped composite pole 133 as shown in FIGS. 4-6. As the term is used herein, "coupling efficiency" refers to power coupled into the media divided by the power incident on the media. While the incident power may be distributed over a fairly broad area, the efficiencies calculated herein may refer to a particular area of interest. For example, the coupling efficiency in a 48 nm by 48 nm may be referred to herein as $CE_{48}$.

Curve 150 in FIG. 7 represents the coupling efficiency for a 24 nm wide notch, and curve 152 represents the coupling efficiency for an 8 nm wide notch. In both these cases, the notch "width" refers to the dimension in the y-direction as seen in FIG. 3. At resonance, the peak efficiency of the 24 nm notch is approximately 5%, which is more than double that of the configurations seen in FIGS. 3 and 3A. The optical field intensity graph of FIG. 8 shows that a linear-varying composite arrangement with the 24 nm notch also maintains an acceptable spot size of 44 nm by 52 nm in the x- and y-directions, respectively, while nearly doubling the maximum field intensity over the NFT configurations of FIGS. 3 and 3A.

Figure 9:
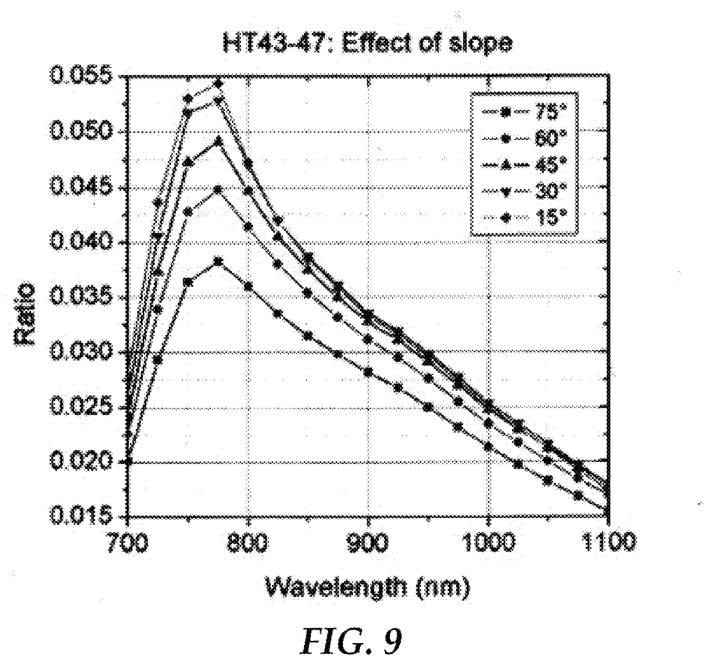
FIG. 9 is a graph of coupling efficiency versus wavelength for various pole slopes according to an example embodiment.

The data for FIGS. 7 and 8 were computed for a 45° slope angle θ for the composite pole, as seen in FIG. 4. However, this angle does not necessarily need to be 45°. FIG. 9 shows that effect of slope angle θ of the composite pole on coupling efficiency. The angle is measured from the vertical (where vertical is perpendicular to the surface of the data storage medium). A smaller angle in such a case may mean an increasing amount of antenna material (e.g., gold) in the pole, e.g., by rotating line 131 by its top edge. As seen in FIG. 9, as the slope angle is reduced, the coupling efficiency increases.

Figure 10:
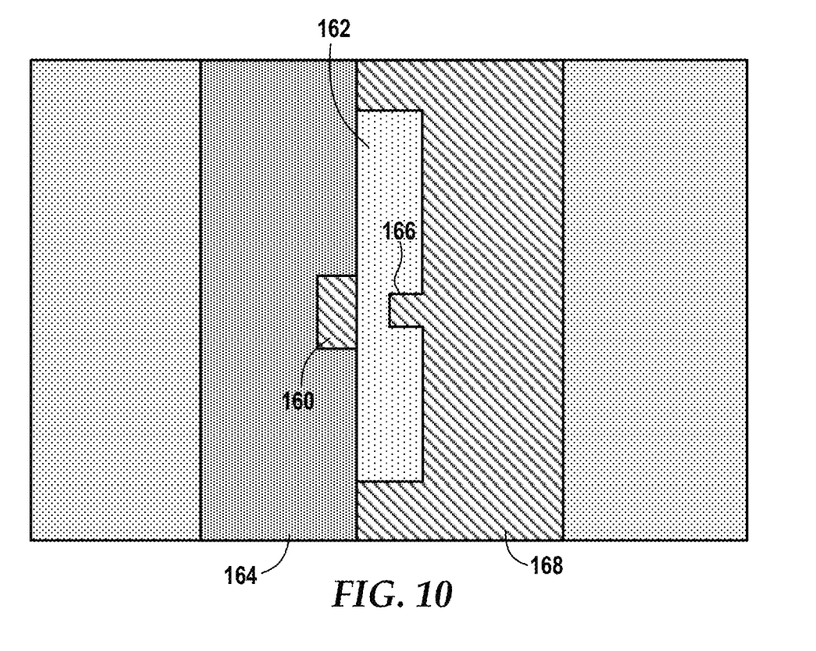
FIG. 10 is a plan view of a portion of an air bearing surface of another recording head having an E-shaped aperture according to an example embodiment.

In reference now to FIG. 10, a cross sectional diagram illustrates a composite NFT/recording head arrangement according to another example embodiment. An E-shaped antenna 168 (e.g., gold or other NFT antenna material) may include a notch 166 as previously described that extends into an aperture 162. The aperture 162 may be filled with a dielectric material. A recording pole 164 (e.g., ferrite) covers the opening of the aperture 162, except where a plug 160 is located across from the notch 166. The plug 160 may be formed from materials similar to that used in the antenna 168, e.g., gold. In this embodiment, the recording pole 164 is wrapped around the plug 160, and may generate a contoured magnetic field which helps to record straight transitions.

Figure 11:
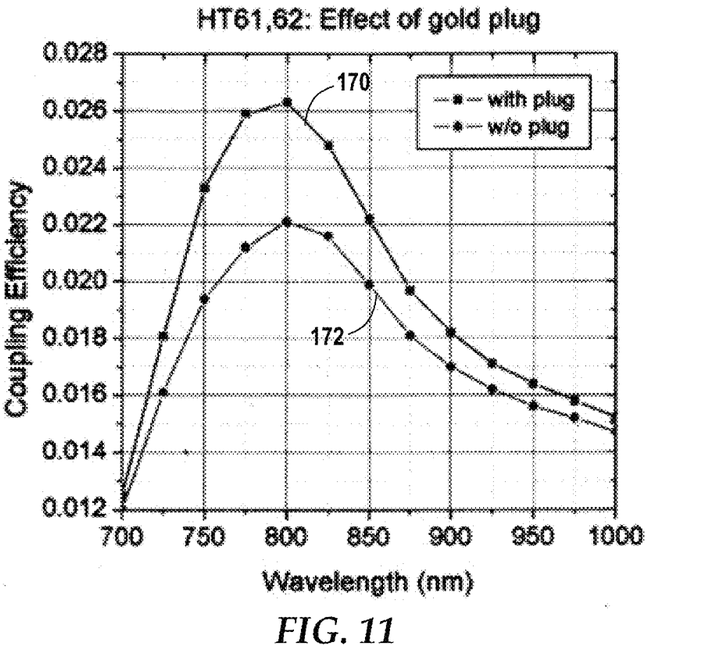
FIG. 11 is a graph of coupling efficiency versus wavelength according to an example embodiment.
Figure 12:
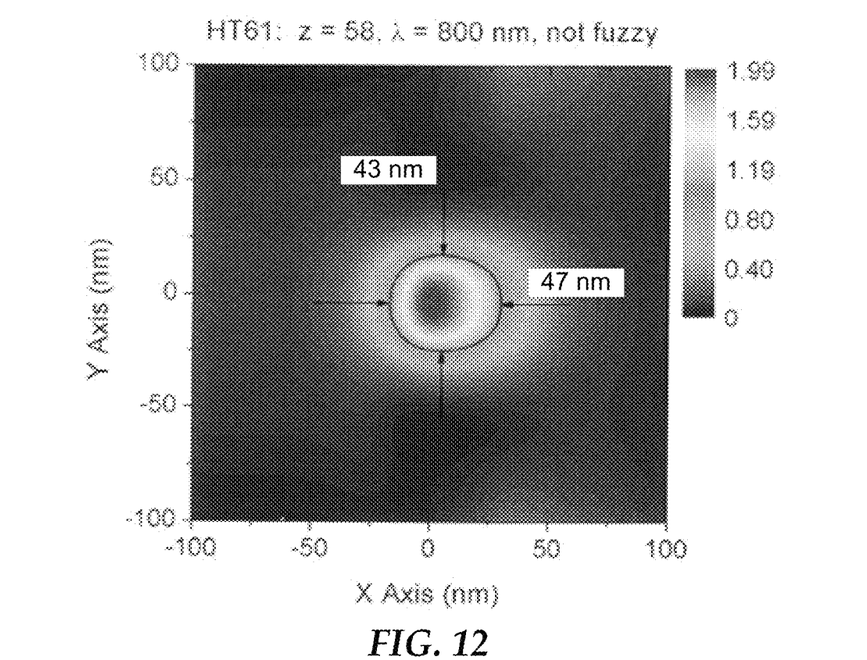
FIGS. 12 and 13 are schematic representations of thermal profiles according to an example embodiment.
Figure 13:
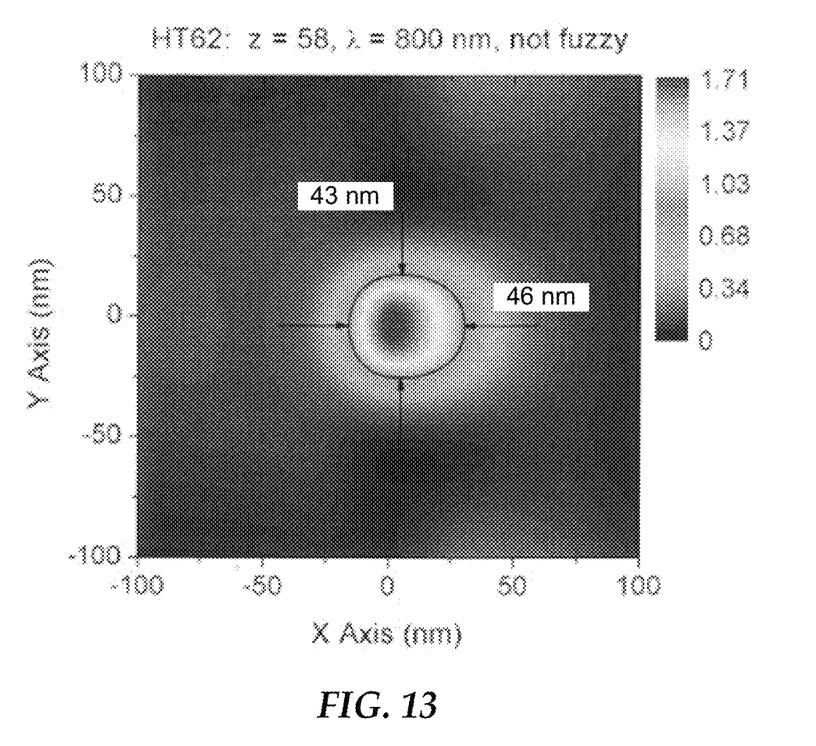

Numerical modeling of the embodiment of FIG. 10 yields results seen in FIGS. 11-13. In FIG. 11, a graph compares the $CE_{48}$ coupling efficiency of the configuration in FIG. 10 (curve 170) with the same design without the gold plug (e.g., similar to FIG. 3A) (curve 172). For both these designs 170, 172, the notch is 24 nm wide, and includes a Cu heat sink in the medium. As can be seen by these curves 170, 172, the gold plug enhances the coupling efficiency by nearly 20% at resonance. The optical spots within the recording medium for respective designs with and without the plug are shown in FIGS. 12 and 13. As can be seen in FIG. 12, the spot is more intense and similar in size with the plug as compared to the result in FIG. 13 without the plug.

Figure 14:
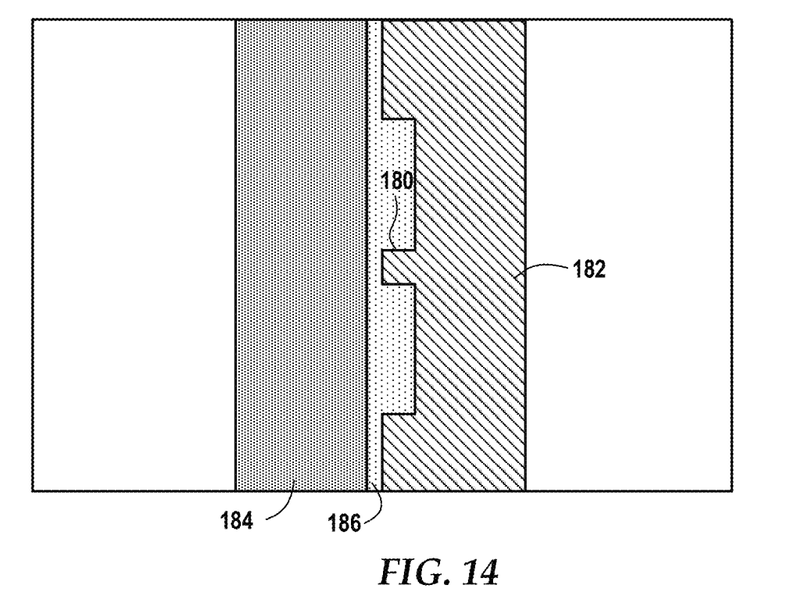
FIG. 14 is a plan view of a portion of an air bearing surface of another recording head according to an example embodiment.

In reference now to FIG. 14, a cross sectional diagram illustrates another example embodiment of a composite NFT recording head arrangement. As with other diagrams, this view is in a plane normal to a direction light propagation through the NFT. An NFT antenna 182 includes a notch 180 as in previous examples. A recording pole 184 (e.g., ferrite, cobalt) is positioned across aperture of the antenna 182. This pole 184 may be a composite pole as in previously described embodiments (e.g., varying material portions along propagation direction, plug disposed across from notch).

A dielectric material 186 fills the aperture, and also forms a dielectric layer between the recording pole 184 and the antenna 182. This design may be simpler to fabricate than a previous E-antenna design, because the spacing between the notch 180 and the recording pole 184 is more easily controlled by means of a thin film deposition process rather than a chemical-mechanical polishing/planarization (CMP) lapping process as might be used in other arrangements.

Figure 15:
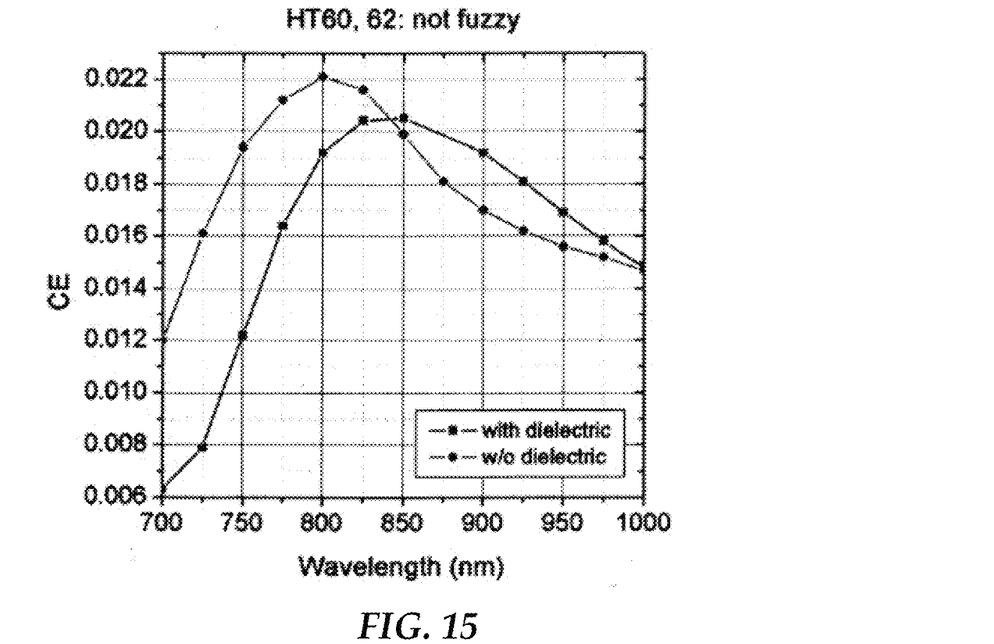
FIG. 15 is a graph of coupling efficiency versus wavelength according to an example embodiment.
Figure 16:
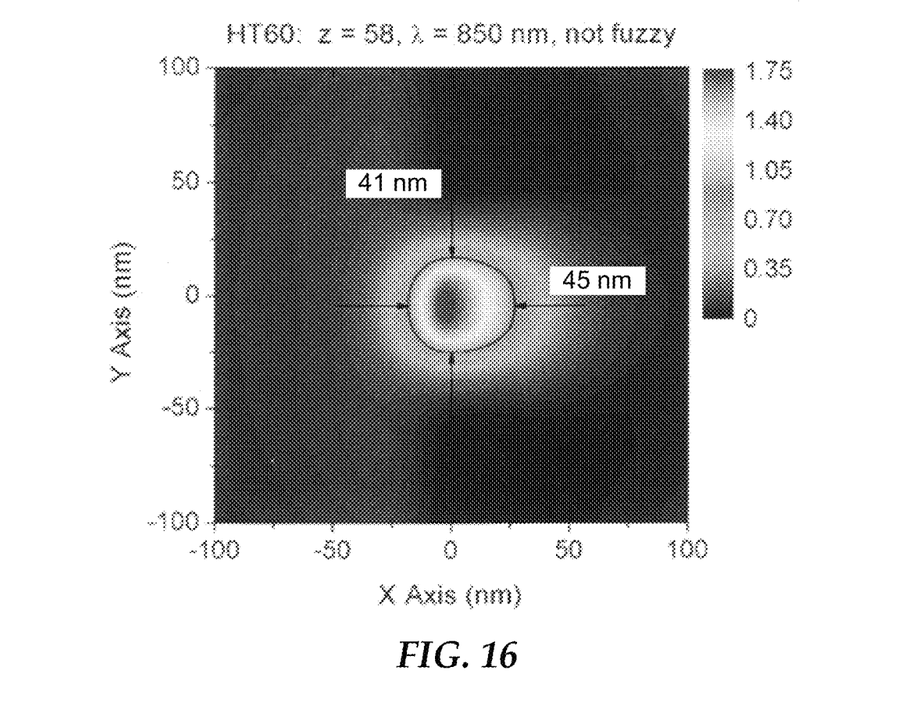
FIG. 16 is schematic representation of a thermal profile according to an example embodiment.

The wavelength dependence of the coupling efficiency for the head of FIG. 14 is shown in FIG. 15. FIG. 15 shows the coupling efficiency ($CE_{48}$) of the E-shaped antenna with a dielectric spacer compared to that without. The optical spot within the recording medium that is produced by the head of FIG. 14 is shown in FIG. 16. Compared to FIG. 13, it can be seen that the spot size is slightly smaller with higher peak intensity than that of the standard E-shaped antenna design, even though the calculated coupling efficiency is somewhat smaller. This discrepancy may be due to the 48 nm×48 nm spot within the medium used to compute the coupling efficiency not being perfectly centered for the optical spot in FIG. 16. Regardless, it appears that the insertion of a small dielectric spacer does not significantly affect the coupling efficiency in an adverse manner.

Figure 17:
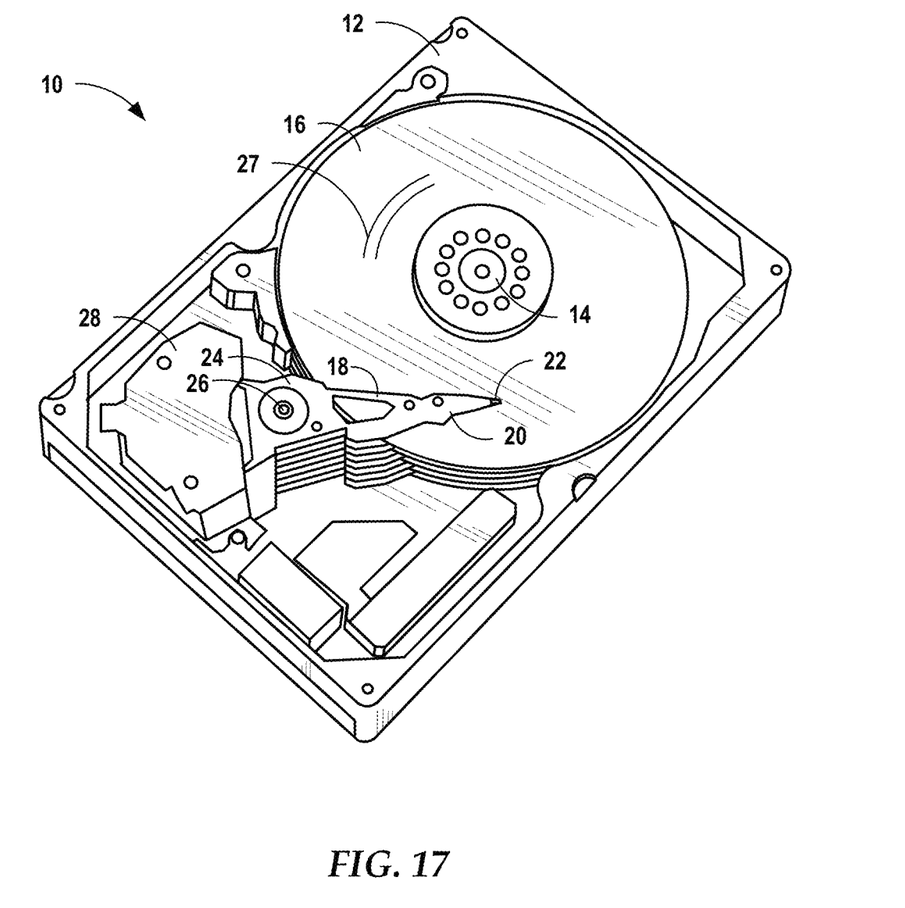
FIG. 17 is a pictorial representation of a data storage device in the form of a disc drive that can include a recording head according to an example embodiment.

In FIG. 17, a data storage device in represented in the form of a disc drive 10 that can utilize a recording head constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

The slider 22 may include a composite write pole and NFT as described above. The composite write pole and NFT may interface with other integrated optical and electrical components of the slider 22. Those other components may include, but are not limited to, read heads, laser light sources (e.g., laser diode), waveguides, mirrors, prisms, gratings, mode converters, and electrical signal/power conductors.

While the several example embodiments have been described hereinabove, it will be apparent to those skilled in the art that various changes can be made to the described examples without departing from the scope of the invention as set forth in the following claims. The implementation described above and other implementations are within the scope of the following claims.

What is claimed is:

1. An apparatus comprising:
  a near field transducer antenna having a first end proximate a media writing surface and a second end proximate a waveguide that delivers light to the antenna, wherein the antenna comprises:
    an aperture disposed along a propagation axis that extends from the first end to the second end; and
    a notch protruding within the aperture, wherein the notch is facing an opening of the aperture that extends along the propagation axis;
  a magnetic pole proximate the antenna, wherein the magnetic pole comprises a first portion of magnetic material and a second portion of non-magnetic antenna material, wherein the second portion is disposed over the opening of the aperture and facing the notch of the antenna.

2. The apparatus of claim 1, wherein cross sectional areas of the first and second portions of the magnetic pole vary relative to each other along the propagation axis.

3. The apparatus of claim 2, wherein the first portion of the magnetic pole comprises a tip that is proximate the opening of the aperture at a cross section near the media-reading surface, and wherein the second portion is disposed between the first portion and the opening of the aperture at cross sections away from the media reading surface.

4. The apparatus of claim 2, wherein the first and second portions of the magnetic pole vary linearly relative to each other along the propagation axis.

5. The apparatus of claim 1, wherein the second portion of the magnetic pole comprises a plug of the antenna material disposed at least partly along the propagation axis.

6. The apparatus of claim 5, wherein the plug covers a portion of the opening of the aperture, and wherein the first portion of magnetic material covers the remainder of the opening of the aperture.

7. The apparatus of claim 5, further comprising a dielectric layer between the magnetic pole and the antenna.

8. The apparatus of claim 1, further comprising a dielectric layer between the magnetic pole and the antenna.

9. The apparatus of claim 8, wherein the dielectric fills the aperture of the antenna.

10. An apparatus comprising:
  a waveguide having an end adjacent to an air bearing surface;
  a near-field transducer positioned adjacent to a focal point of the waveguide, wherein the near-field transducer includes an E-shaped cross sectional shape along cross sections parallel to the air bearing surface, wherein a propagation direction of the near-field transducer is normal to the air bearing surface; and
  a write pole magnetically proximate one side of the near-field transducer along the propagation direction, wherein the write pole includes a non-magnetic portion and a magnetic portion, wherein the non-magnetic portion covers at least part of the E-shaped cross-sectional shape of the near-field transducer along at least part of the propagation direction.

11. The apparatus of claim 10, wherein cross sectional areas of the magnetic and non-magnetic portions of the write pole vary relative to each other along the propagation axis.

12. The apparatus of claim 11, wherein the magnetic portion of the write pole comprises a tip that is proximate the near-field transducer near the air bearing surface, and wherein the non-magnetic portion is disposed between the magnetic portion and the near-field transducer at cross sections away from the air bearing surface.

13. The apparatus of claim 11, wherein the magnetic and non-magnetic portions of the write pole of the write pole vary linearly relative to each other along the propagation direction.

14. The apparatus of claim 10, wherein the non-magnetic portion of the write pole comprises a plug of an antenna material disposed at least partly along the propagation direction.

15. The apparatus of claim 14, wherein the plug covers a portion of an opening of the E-shaped cross-sectional shape, and wherein the magnetic material covers the remainder of the opening.

16. The apparatus of claim 14, further comprising a dielectric layer between the write pole and the near-field antenna.

17. The apparatus of claim 10, further comprising a dielectric layer between the magnetic pole and the antenna.

18. The apparatus of claim 17, wherein the dielectric fills a aperture of the near-field transducer.

19. An apparatus comprising:
  means for producing a focused electric field at a media writing surface in response to local surface plasmon conditions being excited by optical energy, wherein the means for producing the focused electric field comprises an aperture disposed along a propagation axis that extends from the media writing surface to a second end, and a notch protruding within the aperture, wherein the notch face an opening of the aperture that extends along the propagation axis;

means for generating a variable magnetic field that comprises a first portion of magnetic material and a second portion of antenna material, wherein the second portion is disposed over the opening of the aperture and facing the notch.

* * * * *